United States Patent
Bashir et al.

(10) Patent No.: US 10,394,857 B2
(45) Date of Patent: Aug. 27, 2019

(54) METHOD AND APPARATUS FOR IDENTIFYING ONE OR MORE TERRITORIES

(71) Applicant: DMTI SPATIAL, INC., Richmond (CA)

(72) Inventors: Omid Bashir, Pickering (CA); Mark Sean Lennox, Richmond Hill (CA); Peter O. Powell, Woodbridge (CA); Vladimir Rabenok, Richmond Hill (CA); Shahed Shirazi, Toronto (CA); Fei Xu, Richmond Hill (CA); Jiahua Yan, Mississauga (CA)

(73) Assignee: DMTI SPATIAL, INC., Richmond, CA (US)

( * ) Notice: Subject to any disclaimer, the term of this patent is extended or adjusted under 35 U.S.C. 154(b) by 298 days.

(21) Appl. No.: 15/010,745

(22) Filed: Jan. 29, 2016

(65) Prior Publication Data
US 2017/0220600 A1 Aug. 3, 2017

(51) Int. Cl.
*G06F 7/00* (2006.01)
*G06F 17/30* (2006.01)
(Continued)

(52) U.S. Cl.
CPC ............. *G06F 16/29* (2019.01); *G01C 21/00* (2013.01); *G01C 21/32* (2013.01); *G06F 16/26* (2019.01);
(Continued)

(58) Field of Classification Search
CPC ........... G06F 17/30241; G06F 17/3087; G06F 17/30858; G06F 16/26; G06F 16/71
(Continued)

(56) References Cited

U.S. PATENT DOCUMENTS

| 8,433,706 B2 | 4/2013 | Wade et al. |
| 8,831,182 B2 | 9/2014 | Nelson et al. |

(Continued)

FOREIGN PATENT DOCUMENTS

WO   WO-03/060657 A2   7/2003

OTHER PUBLICATIONS

File History of U.S. Appl. No. 14/610,712, 480 pages.
(Continued)

*Primary Examiner* — Md I Uddin
(74) *Attorney, Agent, or Firm* — Choate, Hall & Stewart LLP (57) ABSTRACT

Methods and apparatus for identifying one or more territories are provided. An example method includes receiving, from a data source, a territory file. The territory file can include data describing territory details such as a geographic territory name, territory geometry information, territory data attributes, and a territory color. Territory data is retrieved from a server, based on data in the territory file. A spatial fabric layer including polygonal regions is loaded from the territory data. A visual representation of one or more polygonal regions is displayed with a video display. User data indicating a selection of one or more polygonal regions can be received to create or update one or more selected territory polygonal regions. Changes made to a territory allocation can be displayed on a video display. The territory file can be updated with data identifying the one or more selected polygonal regions, and stored.

21 Claims, 4 Drawing Sheets

(51) Int. Cl.
  *G06F 16/29* (2019.01)
  *G06F 16/26* (2019.01)
  *G06F 16/71* (2019.01)
  *G06F 16/78* (2019.01)
  *G06F 16/9537* (2019.01)
  *G01C 21/00* (2006.01)
  *G09B 29/00* (2006.01)
  *G01C 21/32* (2006.01)

(52) U.S. Cl.
  CPC .......... *G06F 16/71* (2019.01); *G06F 16/7867* (2019.01); *G06F 16/9537* (2019.01); *G09B 29/007* (2013.01)

(58) Field of Classification Search
  USPC .................. 707/722, 736, 769, 741, 999.003
  See application file for complete search history.

(56) References Cited

U.S. PATENT DOCUMENTS

| | | | |
|---|---|---|---|
| 8,924,377 B2 | 12/2014 | Wade et al. | |
| 2006/0095202 A1* | 5/2006 | Atarashi | G01C 21/32 701/451 |
| 2006/0122768 A1* | 6/2006 | Sumizawa | G01C 21/32 701/453 |
| 2013/0104035 A1* | 4/2013 | Wagner | G06F 17/30241 715/240 |
| 2014/0033101 A1* | 1/2014 | Rein | G06F 17/30575 715/771 |
| 2016/0224992 A1 | 8/2016 | Powell | |
| 2017/0220702 A1 | 8/2017 | Rabenok | |
| 2017/0220975 A1 | 8/2017 | Oba | |

OTHER PUBLICATIONS

File History of U.S. Appl. No. 15/008,675, 477 pages.
File History of U.S. Appl. No. 15/008,698, 477 pages.
Canadian Office Action for CA Application No. 2,956,243 (Method and Apparatus for Identifying One or More Territories, filed Jan. 26, 2017), 6 pages (dated Sep. 25, 2018).
Canadian Office Action for CA Application No. 2,956,158 (Method and Apparatus for Postal Addressing Matching, filed Jan. 26, 2017), 4 pages (dated Dec. 11, 2017).
Canadian Office Action for CA Application No. 2,956,158 (Method and Apparatus for Postal Address Matching, filed Jan. 26, 2017) 6 pages (dated Sep. 25, 2018).
Canadian Office Action for CA Application No. 2,956,158 (Method and Apparatus for Postal Address Matching, filed Jan. 26, 2017) 6 pages (dated Nov. 26, 2018).

* cited by examiner

METHOD AND APPARATUS FOR IDENTIFYING ONE OR MORE TERRITORIES

FIELD OF DISCLOSURE

This disclosure relates generally to electronics, and more specifically, but not exclusively, to methods and apparatus which enable a user to identify one or more territories.

BACKGROUND

Geodemographics analyzes demographic data associated with a specific geographic area. The demographic data can be used to profile a population in the specific demographic area, and can be used to determine demographic differences between populations in different geographic areas.

SUMMARY

This summary provides a basic understanding of some aspects of the present teachings. This summary is not exhaustive in detail, and is neither intended to identify all critical features, nor intended to limit the scope of the claims.

In an example, a method for identifying one or more territories is provided. The method includes receiving, from a data source, a territory file. The territory file includes data describing a geographic territory name, territory geometry information, territory data attributes, and a territory color. The method includes retrieving, from a server, territory data. The territory data is retrieved based on data in the territory file. The method includes loading, from the territory data, a spatial fabric layer. The spatial fabric layer includes a plurality of polygonal regions. The method includes displaying, with a video display, a visual representation of one or more polygonal regions in the plurality of polygonal regions. The method can include receiving user data indicating a selection of one or more polygonal regions in the plurality of polygonal regions to create or update one or more selected territory polygonal regions, displaying, with the video display, changes made to a territory allocation due to the user data, include updating the territory file with data identifying the one or more selected polygonal regions, and include storing the updated territory file. The method can include receiving user data indicating a selection of the territory file from a plurality of territory files. The method can include displaying the one or more selected polygonal regions and an unselected polygonal region. The one or more selected polygonal regions are displayed in a manner different from the unselected polygonal region. The method can include receiving user data identifying a territory label for the one or more selected polygonal regions, and include updating the territory file with the data identifying the territory label. The method can include displaying, with the video display, a territory label identifying one or more selected polygonal regions in the plurality of polygonal regions. The method can include displaying, if the one or more selected polygonal regions are unassigned, an indication the one or more selected polygonal regions are unassigned, and include receiving user data indicating an assignment for the one or more selected polygonal regions. The one or more polygonal regions in the plurality of polygonal regions can correspond to a forward sortation area, a local delivery unit, or a combination thereof. The method can include creating a seamless polygonal spatial fabric for use as the plurality of polygonal regions. The one or more polygonal regions in the plurality of polygonal regions can correspond to a zip code region, a populated place name region, a municipal amalgamated file region, an election district, a micro-neighborhood, a nano-neighborhood, a dissemination area, a user-defined region, a drivetime polygon, a flood polygon, or a combination thereof. The method can include receiving user data indicating a command to select a larger region of which the one or more polygonal regions are a constituent part. The method can include receiving user data indicating a command to select a second polygonal region adjacent to the one or more selected polygonal regions. The method can include receiving, from the data source, a point-of-interest (POI) file, include loading a POI layer from POI data in the POI file, and include displaying, with the video display, a visual representation of the POI layer. The POI file can include an address, a longitude, a latitude, or a combination thereof. The method can include receiving user data identifying a point-of-interest (POI), and include displaying, with the video display, a visual representation of the POI. The method can include receiving data indicating an instruction to launch a table view of a table associated with the one or more selected polygonal regions, and include displaying, with the video display, a visual representation of the table view. The method can include creating a revised table by receiving user data indicating an edit in a field in the table, and storing the revised table in the updated territory file. The method can include calculating aggregated values of data attributes, and displaying, with the video display, a visual representation of the aggregated values of the data attributes. The data attributes can originate from the territory file, a point-of-interest, or another data source. The method can include receiving user data indicating a selection of one or more polygonal regions in the plurality of polygonal regions to create or update one or more selected territory polygonal regions, and include displaying, with the video display, the aggregated values of the data attributes during the receiving the user data. The method can include identifying overlapping assigned territory polygons, invalid territory polygons, and duplicate territory polygons. The method can include updating the territory file with data indicating a generated color and style. The method can include receiving the territory file via a computer network, from a computer, from a mobile device, from a wearable device, from a cloud-based computer network, or a combination thereof.

In a further example, provided is a non-transitory computer-readable medium, including processor-executable instructions stored thereon. The processor-executable instructions are configured to cause a processor to initiate executing one or more parts of the aforementioned method. The non-transitory computer-readable medium can be integrated with a computing device.

In another example, provided is a first apparatus configured to identify one or more territories. The first apparatus includes means for receiving, from a data source, a territory file. The territory file includes data describing a geographic territory name, territory geometry information, territory data attributes, and a territory color. The first apparatus includes means for retrieving, from a server, territory data. The territory data is retrieved based on data in the territory file. The first apparatus includes means for loading, from the territory data, a spatial fabric layer. The spatial fabric layer includes a plurality of polygonal regions. The first apparatus includes means for displaying a visual representation of one or more polygonal regions in the plurality of polygonal regions. The first apparatus can include means for receiving user data indicating a selection of one or more polygonal regions in the plurality of polygonal regions to create or update one or more selected territory polygonal regions. The first apparatus can include means for displaying changes made to a territory allocation due to the user data. The first apparatus can include means for updating the territory file with data identifying the one or more selected polygonal regions. The first apparatus can include means for storing the updated territory file. The first apparatus can include means for receiving user data indicating a selection of the territory file from a plurality of territory files. The first apparatus can include means for displaying the one or more selected polygonal regions and an unselected polygonal region. The one or more selected polygonal regions are displayed in a manner different from the unselected polygonal region. The first apparatus can include means for receiving user data identifying a territory label for the one or more selected polygonal regions, and means for updating the territory file with the data identifying the territory label. The first apparatus can include means for displaying a territory label identifying one or more selected polygonal regions in the plurality of polygonal regions. The first apparatus can include means for displaying, if the one or more selected polygonal regions are unassigned, an indication the one or more selected polygonal regions are unassigned; and means for receiving user data indicating an assignment for the one or more selected polygonal regions. The one or more polygonal regions in the plurality of polygonal regions can correspond to a forward sortation area, a local delivery unit, or a combination thereof. The first apparatus can include means for creating a seamless polygonal spatial fabric for use as the plurality of polygonal regions. The one or more polygonal regions in the plurality of polygonal regions can correspond to a zip code region, a populated place name region, a municipal amalgamated file region, an election district, a micro-neighborhood, a nano-neighborhood, a dissemination area, a user-defined region, a drivetime polygon, a flood polygon, or a combination thereof. The first apparatus can include means for receiving user data indicating a command to select a larger region of which the one or more polygonal regions are a constituent part. The first apparatus can include means for receiving user data indicating a command to select a second polygonal region adjacent to the one or more selected polygonal regions. The first apparatus can include means for receiving, from the data source, a point-of-interest (POI) file, means for loading a POI layer from POI data in the POI file, and means for displaying a visual representation of the POI layer. The POI file can include an address, a longitude, a latitude, or a combination thereof. The first apparatus can include means for receiving user data identifying a point-of-interest (POI), and means for displaying a visual representation of the POI. The first apparatus can include means for receiving data indicating an instruction to launch a table view of a table associated with the one or more selected polygonal regions, and means for displaying a visual representation of the table view. The first apparatus can include means for creating a revised table by receiving user data indicating an edit in a field in the table, and means for storing the revised table in the updated territory file. The first apparatus can include means for calculating aggregated values of data attributes, and means for displaying a visual representation of the aggregated values of the data attributes. The data attributes can originate from the territory file, a point-of-interest, or another data source. The first apparatus can include means for receiving user data indicating a selection of one or more polygonal regions in the plurality of polygonal regions to create or update one or more selected territory polygonal regions, and means for displaying the aggregated values of the data attributes during the receiving the user data. The first apparatus can include means for identifying overlapping assigned territory polygons, invalid territory polygons, and duplicate territory polygons. The first apparatus can include means for updating the territory file with data indicating a generated color and style. The means for receiving the territory file can further include means for receiving the territory file via a computer network, from a computer, a mobile device, a wearable device, a cloud-based computer network, or a combination thereof. The first apparatus can include a computing device, with which the means for receiving the territory file is a constituent part. The first apparatus can include a computing device with which the processor is integrated. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

In another example, provided is a second apparatus configured to identify one or more territories. The second apparatus includes a processor and a memory coupled to the processor and configured to cause the processor to create specific logic circuits within the processor. The specific logic circuits are configured to cause the processor to receive, from a data source, a territory file. The territory file includes data describing a geographic territory name, territory geometry information, territory data attributes, and a territory color. The specific logic circuits are configured to cause the processor to retrieve, from a server, territory data. The territory data is retrieved based on data in the territory file. The specific logic circuits are configured to cause the processor to load, from the territory data, a spatial fabric layer. The spatial fabric layer includes a plurality of polygonal regions. The specific logic circuits are configured to cause the processor to display, with a video display, a visual representation of one or more polygonal regions in the plurality of polygonal regions. The memory can be configured to cause the processor to initiate creating specific logic circuits configured to cause the processor to receive user data indicating a selection of one or more polygonal regions in the plurality of polygonal regions to create or update one or more selected territory polygonal regions, to display, with the video display, changes made to a territory allocation due to the user data, to update the territory file with data identifying the one or more selected polygonal regions, and to store the updated territory file. The memory can be configured to cause the processor to cause the processor to initiate creating specific logic circuits configured to cause the processor to receive user data indicating a selection of the territory file from a plurality of territory files. The memory can be configured to cause the processor to cause the processor to initiate creating specific logic circuits configured to cause the processor to display the one or more selected polygonal regions and an unselected polygonal region. The one or more selected polygonal regions are displayed in a manner different from the unselected polygonal region. The memory can be configured to cause the processor to cause the processor to initiate creating specific logic circuits configured to cause the processor to receive user data identifying a territory label for the one or more selected polygonal regions, and to update the territory file with the data identifying the territory label. The memory can be configured to cause the processor to cause the processor to initiate creating specific logic circuits configured to cause the processor to display, with the video display, a territory label identifying one or more selected polygonal regions in the plurality of polygonal regions. The memory can be configured to cause the processor to cause the processor to initiate creating specific logic circuits configured to cause the processor to display, if the one or more selected polygonal regions are unassigned, an indication the one or more selected polygonal regions are unassigned, and to receive user data indicating an assignment for the one or more selected polygonal regions. The one or more polygonal regions in the plurality of polygonal regions can correspond to a forward sortation area, a local delivery unit, or a combination thereof. The memory can be configured to cause the processor to cause the processor to initiate creating specific logic circuits configured to cause the processor to create a seamless polygonal spatial fabric for use as the plurality of polygonal regions. The one or more polygonal regions in the plurality of polygonal regions can correspond to a zip code region, a populated place name region, a municipal amalgamated file region, an election district, a micro-neighborhood, a nano-neighborhood, a dissemination area, a user-defined region, a drivetime polygon, a flood polygon, or a combination thereof. The memory can be configured to cause the processor to cause the processor to initiate creating specific logic circuits configured to cause the processor to receive user data indicating a command to select a larger region of which the one or more polygonal regions is a constituent part. The memory can be configured to cause the processor to initiate creating specific logic circuits configured to cause the processor to receive user data indicating a command to select a second polygonal region adjacent to the one or more selected polygonal regions. The memory can be configured to cause the processor to cause the processor to initiate creating specific logic circuits configured to cause the processor to receive, from the data source, a point-of-interest (POI) file, to load a POI layer from POI data in the POI file, and to display, with the video display, a visual representation of the POI layer. The POI file can include an address, a longitude, a latitude, or a combination thereof. The memory can be configured to cause the processor to cause the processor to initiate creating specific logic circuits configured to cause the processor to receive user data identifying a point-of-interest (POI), and to display, with the video display, a visual representation of the POI. The memory can be configured to cause the processor to cause the processor to initiate creating specific logic circuits configured to cause the processor to receive data indicating an instruction to launch a table view of a table associated with the one or more selected polygonal regions, and to display, with the video display, a visual representation of the table view. The memory can be configured to cause the processor to cause the processor to initiate creating specific logic circuits configured to cause the processor to create a revised table by receiving user data indicating an edit in a field in the table, and to store the revised table in the updated territory file. The memory can be configured to cause the processor to cause the processor to initiate creating specific logic circuits configured to cause the processor to calculate aggregated values of data attributes, and to display, with the video display, a visual representation of the aggregated values of the data attributes. The data attributes can originate from the territory file, a point-of-interest, or another data source. The memory can be configured to cause the processor to cause the processor to initiate creating specific logic circuits configured to cause the processor to receive user data indicating a selection of one or more polygonal regions in the plurality of polygonal regions to create or update one or more selected territory polygonal regions, and to display, with the video display, the aggregated values of the data attributes during the receiving the user data. The memory can be configured to cause the processor to cause the processor to initiate creating specific logic circuits configured to cause the processor to identify overlapping assigned territory polygons, invalid territory polygons, and duplicate territory polygons. The memory can be configured to cause the processor to cause the processor to initiate creating specific logic circuits configured to cause the processor to update the territory file with data indicating a generated color and style. The memory can be configured to cause the processor to cause the processor to initiate creating specific logic circuits configured to cause the processor to initiate receiving the territory file via a computer network, from a computer, a mobile device, a wearable device, a cloud-based computer network, or a combination thereof. The apparatus can further include a computing device with which the processor is integrated. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof. The second apparatus can include a computing device with which the processor is integrated. The processor can be a microprocessor, a microcontroller, a digital signal processor, a field programmable gate array, a programmable logic device, an application-specific integrated circuit, a controller, a non-generic special-purpose processor, a state machine, a gated logic device, a discrete hardware component, a dedicated hardware finite state machine, or a combination thereof.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all compo-

DETAILED DESCRIPTION

Methods and apparatus for identifying one or more territories are provided. The entirety of the following document is incorporated by reference into this disclosure: U.S. patent application Ser. No. 14/610,712, entitled "Postal Fabric Generator," filed Jan. 30, 2015.

Figure 1A:
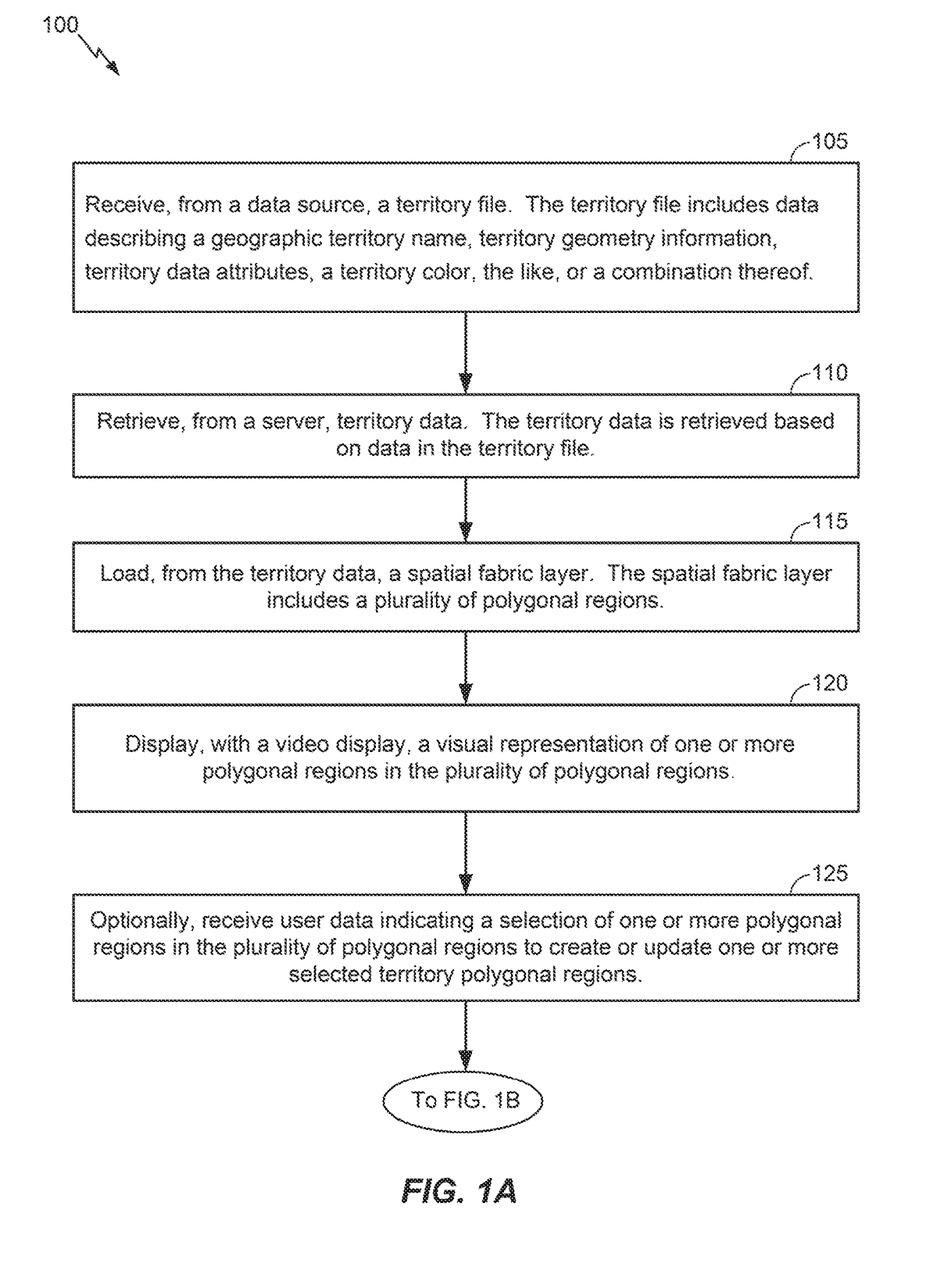
FIGS. 1A-1B depict an example method for identifying one or more territories.
Figure 1B:
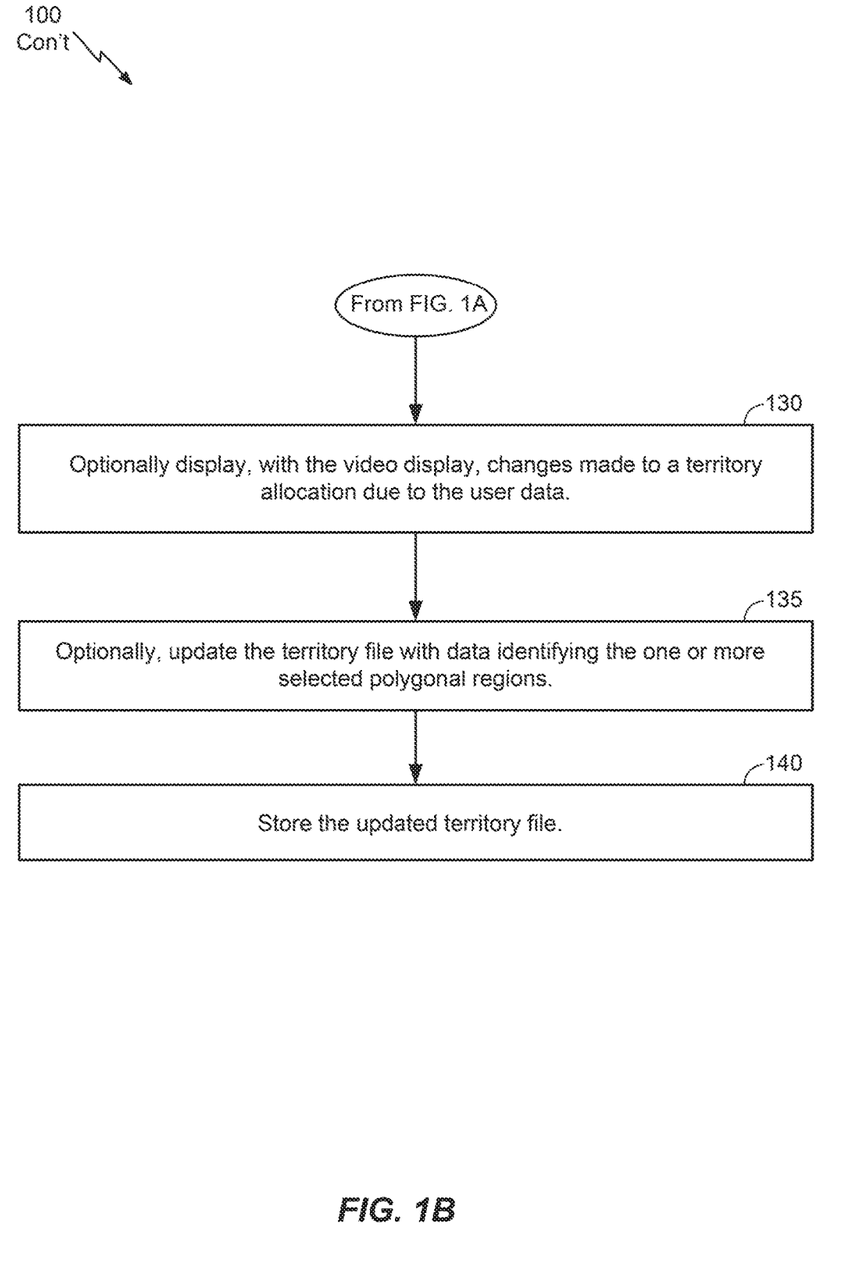
Figure 2:
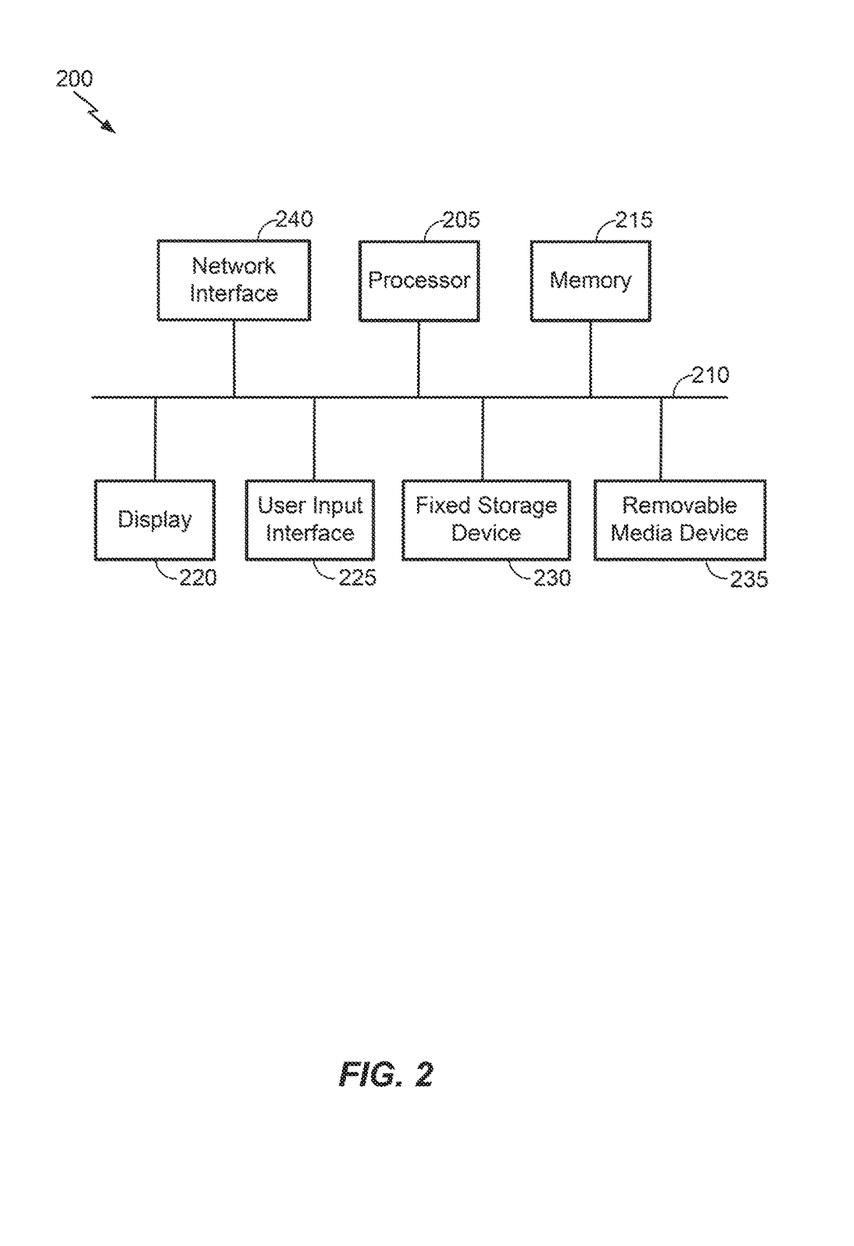
FIG. 2 depicts an example computing device.
Figure 3:
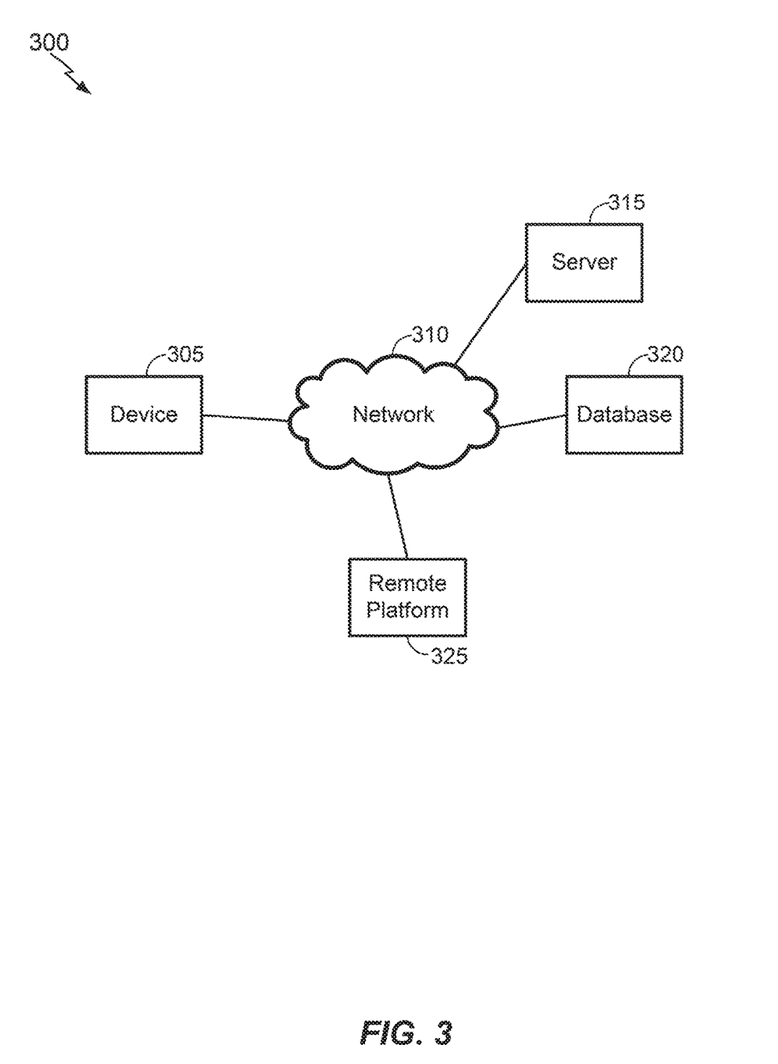
FIG. 3 depicts an example network.

FIGS. 1A-1B depict an example method 100 for identifying one or more territories. The method 100 can be performed by the apparatus described hereby, such as a computing device 200 (as depicted in FIG. 2), an electronic device 305 (as depicted in FIG. 3), a server 315 (as depicted in FIG. 3), a remote platform 325 (as depicted in FIG. 3), the like, or a combination thereof.

In block 105, a territory file is received from a data source. The territory file can include data describing a geographic territory name, territory geometry information (e.g., a set of points, a set of boundaries, the like), territory data attributes, a territory color, the like, or combinations thereof. User data indicating a selection of the territory file from a plurality of territory files can be received. The territory file can be received via a computer network, from a computer, from a mobile device, from a wearable device, from a cloud-based computer network, or a combination thereof. The territory file can be received (i.e., uploaded) by a user.

In block 110, territory data is retrieved from a server. The territory data is retrieved based on data in the territory file.

In block 115, data describing a spatial fabric layer is loaded from the territory data. The spatial fabric layer data includes data identifying a plurality of polygonal regions. A seamless (i.e., having no gaps between polygonal regions) polygonal spatial fabric can be created for use as the plurality of polygonal regions. The plurality of polygonal regions can correspond to a forward sortation area, a local delivery unit, a zip code region, a populated place name region, a municipal amalgamated file region, an election district, a micro-neighborhood, a nano-neighborhood, a dissemination area, a user-defined region, a drivetime polygon, a flood polygon, the like, or a combination thereof.

In block 120, a visual representation of one or more polygonal regions in the plurality of polygonal regions is displayed with a video display. The visual representation can be a map view depicting a map. The map is generated at least in part from the territory data. A user can enable and/or disable depiction of a territory layer, a forward sorting area, a region to which a local delivery unit is assigned, a region to which a postal code is assigned, the like, or a combination thereof.

In optional block 125 user data indicating a selection of one or more polygonal regions in the plurality of polygonal regions is received. A user can assemble a collection of selected territory polygonal regions (e.g., a study area, a sales territory for a salesperson, the like). In an example, the selected territory polygonal regions can be a part of only one collection. The selection can create or update one or more selected territory polygonal regions.

The received user data can indicate a selection or deselection of a boundary (e.g., by dropping points onto a visual depiction of a map). The received user data indicating the selection or the deselection of the boundary can be received from a user input device (e.g., a computer mouse). The boundary can be based on one or more regions defined by one or more forward sortation areas, local delivery units, zip code regions, populated place name regions, municipal amalgamated file regions, election districts, micro-neighborhoods, nano-neighborhoods, dissemination areas, user-defined regions, drivetime polygons, flood polygons, the like, or a combination thereof. In an example, a user is not permitted to move or delete one or more specific polygonal regions.

A territory label identifying one or more selected polygonal regions in the plurality of polygonal regions can be displayed with the video display. The one or more selected polygonal regions and an unselected polygonal region can be concurrently displayed. Further, the one or more selected polygonal regions can be displayed in a manner different from the unselected polygonal region. Aggregate region data calculated from territory data attributes across multiple respective polygonal regions can also be displayed to assist a user in determining if, and to whom, a region should be (re)assigned, For example, if the territory file includes the following data for different regions:

Assignee, Postal Code, Count, Sales
Fei, L3R5B4, 100, 1000
Fei, L3R9T8, 125, 2000
Fei, L3R5A4, 155, 2500
Shahed, L3R5Y1, 200, 2100
Shahed, L3R0C9, 99, 1500
Shahed, L3R5L7, 50, 2000

The aggregate region data can be displayed as:

| Assignee | Count | Sales |
|---|---|---|
| Fei | 380 | 5500 |
| Shahed | 349 | 5600 |

A report including the aggregate region data can be generated, stored, transferred, displayed, provided to a user, the like, or a combination thereof.

User data identifying a territory label for the one or more selected polygonal regions can be received, and the territory file is updated with the data identifying the territory label. If the one or more selected polygonal regions are unassigned to a person, an indication the one or more selected polygonal regions are unassigned can be displayed (e.g., by displaying a pop-up box). Further, user data indicating an assignment for the one or more selected polygonal regions can be received. Overlapping assigned territory polygons, invalid territory polygons, duplicate territory polygons, the like, or combinations thereof can be identified and can be displayed with the video display.

A user can select an unassigned polygonal region for assignment using a computer mouse. Thus, user data indicating selection of unassigned polygonal region for assignment can be received. The user can then assign the unassigned polygonal region. The assignment can include identifying a person to which the territory is assigned, selecting a color for the polygonal region (if none is already assigned), adding a label for the polygonal region, saving the assignment, custom user data, the like, or a combination thereof. Moreover, a person's name that is associated with an assigned polygonal region can be deleted, thus leaving the polygonal region unassigned.

User data indicating a command to select a larger region of which the one or more polygonal regions are a constituent part can be received. Further, user data indicating a command to select a second polygonal region adjacent to the one or more selected polygonal regions can be received.

A point-of-interest (POI) file can be received from the data source. The POI file can include an address, a longitude, a latitude, coordinate data, the like, or a combination thereof. A POI layer can be loaded from POI data in the POI file. A visual representation of the POI layer can be displayed with the video display. Further, user data identifying a point-of-interest (POI) can be received, and a visual representation of the POI can be displayed with the video display.

Data indicating an instruction to launch a table view of a table associated with the one or more selected polygonal regions can be received, and a visual representation of the table view can be displayed with the video display. The table view can be an alternative to the map view. A table can be created for a newly-assigned polygonal region. A revised table can be created by receiving user data indicating an edit in a field in the table. Fields in the table can be edited. Fields in the table can include data indicating a name of a person to which the selected polygonal region is assigned, a territory forward sortation area, a territory local delivery unit, a geographic territory name, territory data attributes, a territory color, a postal code, a sales count, a sales value, a sales target, the like, or a combination thereof. The revised table can be stored in the updated territory file. Further, data indicating a boundary on the map can be updated and saved.

Aggregated values of data attributes can be calculated and a visual representation of the aggregated values of the data attributes can be displayed with the video display. The data attributes can originate from the territory file, a point-of-interest, or another data source. User data indicating a selection of one or more polygonal regions in the plurality of polygonal regions to create or update one or more selected territory polygonal regions can be received, and the aggregated values of the data attributes can be displayed with the video display concurrently with the receiving the user data. In optional block 130 changes made to a territory allocation due to the user data are displayed with the video display. The polygonal regions can be a part of a single display layer, the display of which can be enabled or disabled by a user. Any information (e.g., data) described herein as being able to be displayed can also, or alternatively, be included in a report. The report can be generated, stored, transferred, displayed, provided to a user, the like, or a combination thereof.

In optional block 135 the territory file is updated with data identifying the one or more selected polygonal regions. Optionally, the territory file can be updated with data indicating a generated color and style for the one or more selected polygonal regions.

In optional block 140, the updated territory file is stored.

The foregoing blocks are not limiting of the examples. The blocks can be combined and/or the order can be rearranged, as practicable.

FIG. 2 illustrates the example computing device 200 suitable for implementing examples of the presently disclosed subject matter. At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation). Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. In an example, a combination of two or more related method steps disclosed hereby can form a sufficient algorithm. A sufficient algorithm can constitute special programming. Special programming can constitute any software which can cause a computer (for example, a general-purpose computer, a special-purpose computer, etc.) to be configured to perform one or more functions, features, steps algorithms, blocks, or a combination thereof, as disclosed hereby.

The computing device 200 can be, for example, a desktop computer, a laptop computer, a mobile device, the like, or a combination thereof. The computing device 200 can include a processor 205, a bus 210, a memory 215 (such as random-access memory (RAM), read-only memory (ROM), flash RAM, the like, or a combination thereof), a video display 220 (such as a display screen), a user input interface 225 (which can include one or more controllers and associated user input devices such as a keyboard, computer mouse, touch screen, the like, or a combination thereof), a fixed storage device 230 (such as a hard drive, flash storage, the like, or a combination thereof), a removable media device 235 (operative to control and receive an optical disk, flash drive, the like, or a combination thereof), a network interface 240 operable to communicate with one or more remote devices via a suitable network connection, or a combination thereof. Examples of the disclosed subject matter can be implemented in, and used with, different component and network architectures.

The processor 205 is configured to control operation of the user device 200, including performing at least a part of a method described hereby. The processor 205 can perform logical and arithmetic operations based on processor-executable instructions stored within the memory 215. The processor 205 can execute instructions stored in the memory 215 to implement at least a part of a method described herein, e.g., the processing illustrated in FIGS. 1A-1B. The instructions, when executed by the processor 205, can transform the processor 205 into a special-purpose processor that causes the processor to perform at least a part of a function described hereby.

The processor 205 can comprise or be a component of a processing system implemented with one or more processors. The one or more processors can be implemented with a microprocessor, a microcontroller, a digital signal processor, a field programmable gate array (FPGA), a programmable logic device (PLD), an application-specific integrated circuit (ASIC), a controller, a state machine, gated logic, a discrete hardware component, a dedicated hardware finite state machine, any other suitable entity that can at least one of manipulate information (for example, calculating, logical operations, the like, or a combination thereof), control another device, the like, or a combination thereof. The processor 205 may also be referred to as a central processing unit (CPU), a special-purpose processor, or both.

The bus 210 interconnects components of the computing device 200. The bus 210 can enable information communication between the processor 205 and one or more components coupled to the processor 205. The bus system 210 can include a data bus, a power bus, a control signal bus, a status signal bus, the like, or a combination thereof. The components of the computing device 200 can be coupled together to communicate with each other using a different suitable mechanism.

The memory 215, can include at least one of read-only memory (ROM), random access memory (RAM), a flash memory, an erasable programmable read-only memory (EPROM), an electrically erasable programmable read-only memory (EEPROM), a register, other memory, the like, or a combination thereof stores information (for example, data, instructions, software, the like, or a combination thereof) and is configured to provide the information to the processor 205. The RAM can be a main memory configured to store an operating system, an application program, the like, or a combination thereof. The ROM (for example, a flash memory) can be configured to store a basic input-output system (BIOS) which can control basic hardware operation such as the processor's 205 interaction with peripheral components. The memory 210 can also include a non-transitory machine-readable media configured to store software. Software can mean any type of instructions, whether referred to as at least one of software, firmware, middleware, microcode, hardware description language, the like, or a combination thereof. Instructions can include code (for example, in source code format, in binary code format, in executable code format, or in any other suitable code format).

The video display 220 can include a component configured to visually convey information to a user of the computing device 200.

The user input interface 225 can include a keypad, a microphone, a speaker, a display, the like, or a combination thereof. The user input interface 225 can include a component configured to convey information to a user of the computing device 200, receive information from the user of the computing device 200, or both.

The fixed storage device 230 can be integral with the computing device 200 or can be separate and accessed through other interfaces. The fixed storage device 230 can be an information storage device which is not configured to be removed during use, such as a hard disk drive.

The removable media device 235 can be integral with the computing device 200 or can be separate and accessed through other interfaces. The removable media device 235 can be an information storage device which is configured to be removed during use, such as a memory card, a jump drive, flash memory, the like, or a combination thereof. Code to implement the present disclosure can be stored in computer-readable storage media such as one or more of the memory 215, the fixed storage device 230, the removable media device 235, a remote storage location, the like, or a combination thereof.

The network interface 240 can electrically couple the computing device 200 to a network and enable exchange of information between the computing device 200 and the network. The network, in turn, can couple the computing device 200 to another electronic device, such as a remote server, a remote storage medium, the like, or a combination thereof. The network can enable exchange of information between the computing device 200 and the electronic device.

The network interface 240 can provide a connection via a wired connection, a wireless connection, or a combination thereof. The network interface 240 can provide such connection using any suitable technique and protocol as is readily understood by one of skill in the art. Example techniques and protocols include digital cellular telephone, Wi-Fi™, Bluetooth®, near-field communications (NFC), the like, and combinations thereof. For example, the network interface 240 can enable the computing device 200 to communicate with other computers via one or more local, wide-area, or other communication networks. Other devices or components (not shown in FIG. 2) (for example, document scanners, digital cameras, and the like) can be coupled via the network interface 240.

All of the components illustrated in FIG. 2 need not be present to practice the present disclosure. Further, the components can be coupled in different ways from that illustrated.

FIG. 3 depicts an example network 300 suitable for implementing examples of the presently disclosed subject matter. The network 300 includes the electronic device 305. The electronic device 305 can include the computing device 200, a local computer, a smart phone, a mobile device, a tablet computer, an electronic device described hereby (as is practicable), the like, or a combination thereof. The electronic device 305 is electrically coupled to a network 310.

The network 310 can be a private network, a local network, a wide-area network, the Internet, any suitable communication network, the like, or a combination thereof. The network 310 can be implemented on any suitable platform including a wired network, a wireless network, an optical network, the like, or a combination thereof.

The network 310 can enable the electronic device 305 to communicate (for example, access) with one or more remote devices, such as the server 315, a database 320, the like, or a combination thereof. In a further example, a remote device can be configured to provide intermediary access, such as where the server 315 is configured to provide access to resources stored in the database 320. The network 310 can enable the electronic device 305 to communicate (for example, access) with the remote platform 325. For example, the remote platform 325 can be a cloud computing arrangement, a search engine, a content delivery system, the like, or a combination thereof. The remote platform 325 can include the server 315, the database 320, the like, or a combination thereof.

All of the components illustrated in FIG. 3 need not be present to practice the present disclosure. Further, the components can be coupled in different ways from that illustrated.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, the like, or a combination thereof. The electromagnetic energy can have a wavelength at a radio frequency, a microwave frequency, a visible optical frequency, an invisible optical frequency, the like, or a practicable combination thereof. These are several non-limiting and non-exhaustive examples.

The term "signal" can include any signal such as a data signal, an audio signal, a video signal, a multimedia signal, an analog signal, a digital signal, the like, or a practicable combination thereof. Information and signals described hereby can be represented using any of a variety of different technologies and techniques. For example, data, an instruction, a process step, a process block, a command, information, a signal, a bit, a symbol, the like, or a practicable combination thereof, which are referred to hereby can be represented by a voltage, a current, an electromagnetic wave, a magnetic field, a magnetic particle, an optical field, an optical particle, the like, or a practicable combination thereof, depending at least in part on the particular application, at least in part on a design, at least in part on a corresponding technology, at least in part on like factors, or a practicable combination thereof.

A reference using a designation such as "first," "second," and so forth does not limit either the quantity or the order of those elements. Rather, these designations are used as a convenient method of distinguishing between two or more elements or instances of an element. A reference to first and second elements does not mean only two elements can be employed. A reference to first and second elements does not mean the first element must necessarily precede the second element. Also, unless stated otherwise, a set of elements can include one or more elements. In addition, terminology of the form "at least one of: X, Y, or Z" or "one or more of X, Y, or Z," or "at least one of the group consisting of X, Y, and Z" can be interpreted as "X or Y or Z or any combination of these elements." For example, this terminology can include X, or Y, or Z, or X and Y, or X and Z, or X and Y and Z, or 2X, or 2Y, or 2Z, and so on.

The terminology used hereby is for the purpose of describing particular examples and is not intended to be limiting. The singular forms "a," "an," and "the" include the plural forms as well, unless the context clearly indicates otherwise. In other words, the singular can portend the plural, where practicable. The terms "comprises," "comprising," "includes," and "including," specify a presence of a feature, an integer, a step, a block, an operation, an element, a component, the like, or a combination thereof. The terms "comprises," "comprising," "includes," and "including," do not necessarily preclude a presence or an addition of another feature, integer, step, block, operation, element, component, and the like.

In examples, an apparatus disclosed hereby can be at least a part of an electronic device, coupled to an electronic device, or a combination thereof, where the electronic device can be, but is not limited to, a mobile device, a navigation device (for example, a global positioning system receiver, a global navigation satellite system receiver, the like, or a combination thereof), a wireless device, a computer, the like, or a combination thereof.

The term "mobile device" can describe, and is not limited to: a mobile phone, a mobile communication device, a mobile hand-held computer, a portable computer, a tablet computer, a wireless device, a wireless modem, a portable tele-transaction computer (PTC), the like, or a combination thereof.

Those of skill in the art will appreciate the example functions, methods, logical blocks, modules, circuits, and steps described in the examples disclosed hereby can be implemented as electronic hardware, computer software, or combinations of both, as is practicable. To illustrate this interchangeability of hardware and software, example functions, methods, logical blocks, modules, circuits, and steps have been described hereby generally in terms of their functionality. Whether such functionality is implemented as hardware or software depends upon a particular application and design constraints imposed on an overall system. Skilled artisans can implement the described functionality in different ways for each particular application, but such implementation decisions should not be interpreted as causing a departure from the scope of the present disclosure.

At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD- ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation). Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. In an example, a combination of two or more related method steps disclosed hereby can form a sufficient algorithm. A sufficient algorithm can constitute special programming. Special programming can constitute any software which can cause a computer (for example, a general-purpose computer, a special-purpose computer, etc.) to be configured to perform one or more functions, features, steps algorithms, blocks, or a combination thereof, as disclosed hereby.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. Additionally, conventional elements of the current teachings may not be described in detail, or may be omitted, to avoid obscuring aspects of the current teachings. While this disclosure describes examples, changes and modifications can be made to the examples disclosed hereby without departing from the scope defined by the appended claims. The present disclosure is not intended to be limited to the specifically disclosed examples alone.

What is claimed is:

1. A method that is executable on a computing system, comprising:
    receiving, from a data source, a territory file, the territory file comprising first data representing a geographic territory name, territory geometry information, territory data attributes, and a territory color;
    retrieving, from a server, territory data, the territory data being retrieved based on at least some of the first data in the territory file;
    loading, from the territory data, a spatial fabric layer that is seamless, the spatial fabric layer comprising a plurality of polygonal regions;
    identifying one or more overlapping polygonal regions among the plurality of polygonal regions;
    calculating aggregated values of the territory data attributes;
    displaying, using a video display, aggregated values of the territory data attributes;
    displaying, using the video display, a first visual representation of one or more first polygonal regions from the plurality of polygonal regions, the first visual representation identifying the one or more overlapping polygonal regions among the one or more first polygonal regions, each of the one or more first polygonal regions being selectable from within the first visual representation;
    receiving, from the first visual representation, second data indicating a selection of a polygonal region among the one or more of the first polygonal regions and an instruction to launch a table view of a table associated with the polygonal region selected;
    displaying, using the video display, a second visual representation comprising the table view;
    receiving user data indicating a selection of one or more second polygonal regions in the plurality of polygonal regions to update the one or more second polygonal regions;
    updating the territory file using third data for the one or more second polygonal regions to produce an updated territory file, the third data comprising a label, a color, and a style for the one or more second polygonal regions;
    storing the updated territory file; and
    displaying, using the video display, changes made to a territory allocation based on the user data.

2. The method of claim 1, further comprising receiving user data indicating selection of the territory file from a plurality of territory files.

3. The method of claim 1, further comprising displaying an unselected polygonal region among the one or more first polygonal regions in the visual representation, wherein the one or more first polygonal regions are displayed in a manner different from the unselected polygonal region.

4. The method of claim 1, further comprising:
    receiving the third data from a user.

5. The method of claim 1, further comprising displaying, using the video display, the label for the one or more second polygonal regions.

6. The method of claim 1, further comprising:
    if the one or more first polygonal regions are unassigned, displaying an indication that the one or more first polygonal regions are unassigned; and receiving user data indicating an assignment for the one or more first polygonal regions.

7. The method of claim 1, wherein the one or more first polygonal regions correspond to a forward sortation area, a local delivery unit, or a combination of a forward sortation area and a local delivery unit.

8. The method of claim 1, wherein the one or more first polygonal regions correspond to one or more of a zip code region, a populated place name region, a municipal amalgamated file region, an election district, a micro-neighborhood, a nano-neighborhood, a dissemination area, a user-defined region, a drivetime polygon, or a flood polygon.

9. The method of claim 1, further comprising receiving user data for a command to select a region of which the one or more first polygonal regions are a constituent part.

10. The method of claim 1, further comprising receiving user data for a command to select a polygonal region adjacent to the one or more first polygonal regions.

11. The method of claim 1, further comprising:
receiving, from the data source, a point-of-interest (POI) file;
loading a POI layer from POI data in the POI file; and
displaying, using the video display, a visual representation of the POI layer.

12. The method of claim 8, wherein the POI file includes one or more of an address, a longitude, or a latitude.

13. The method of claim 1, further comprising:
receiving user data identifying a point-of-interest (POI) among the one or more first polygonal regions;
displaying, using the video display, a visual representation of the POI.

14. The method of claim 1, further comprising:
creating a revised table by receiving user data indicating an edit in a field in the table; and
storing the revised table in an updated territory file.

15. The method of claim 1, wherein the territory data attributes comprise a point-of-interest in an area represented by the one or more first polygonal regions.

16. The method of claim 1, further comprising:
receiving user data indicating a selection of the one or more first polygonal regions; and
wherein the aggregated values of the territory data attributes are based on the user data indicating a selection of the one or more first polygonal regions.

17. One or more non-transitory machine-readable storage media storing instructions that are executable on a computing system to perform operations comprising:
receiving, from a data source, a territory file, the territory file comprising first data representing a geographic territory name, territory geometry information, territory data attributes, and a territory color;
retrieving, from a server, territory data, the territory data being retrieved based on at least some of the first data in the territory file;
loading, from the territory data, a spatial fabric layer that is seamless, the spatial fabric layer comprising a plurality of polygonal regions;
identifying one or more overlapping polygonal regions among the plurality of polygonal regions;
calculating aggregated values of the territory data attributes;
displaying, using a video display, aggregated values of the territory data attributes;
displaying, using the video display, a first visual representation of one or more first polygonal regions from the plurality of polygonal regions, the first visual representation identifying the one or more overlapping polygonal regions among the one or more first polygonal regions, each of the one or more first polygonal regions being selectable from within the first visual representation;
receiving, from the first visual representation, second data indicating a selection of a polygonal region among the one or more of the first polygonal regions and an instruction to launch a table view of a table associated with the polygonal region selected;
displaying, using the video display, a second visual representation comprising the table view;
receiving user data indicating a selection of one or more second polygonal regions in the plurality of polygonal regions to update the one or more second polygonal regions;
updating the territory file using third data for the one or more second polygonal regions to produce an updated territory file, the third data comprising a label, a color, and a style for the one or more second polygonal regions;
storing the updated territory file; and
displaying, using the video display, changes made to a territory allocation based on the user data.

18. The one or more non-transitory machine-readable storage media of claim 17, wherein the operations comprise displaying an unselected polygonal region among the one or more first polygonal regions in the visual representation, wherein the one or more first polygonal regions are displayed in a manner different from the unselected polygonal region.

19. The one or more non-transitory machine-readable storage media of claim 17, wherein the operations comprise:
receiving user data indicating a selection of the one or more first polygonal regions;
wherein the aggregated values of the territory data attributes are based on the user data indicating a selection of the one or more first polygonal regions.

20. The one or more non-transitory machine-readable storage media of claim 17, wherein the operations comprise:
if the one or more first polygonal regions are unassigned, displaying an indication that the one or more first polygonal regions are unassigned; and
receiving user data indicating an assignment for the one or more first polygonal regions.

21. The one or more non-transitory machine-readable storage media of claim 17, wherein the operations comprise:
receiving user data identifying a point-of-interest (POI) among the one or more first polygonal regions; and
displaying, using the video display, a visual representation of the POI.

* * * * *

UNITED STATES PATENT AND TRADEMARK OFFICE
CERTIFICATE OF CORRECTION

PATENT NO. : 10,394,857 B2
APPLICATION NO. : 15/010745
DATED : August 27, 2019
INVENTOR(S) : Omid Bashir et al.

It is certified that error appears in the above-identified patent and that said Letters Patent is hereby corrected as shown below:

In the Claims

In Claim 12, Column 17, Line 25, please delete:
"claim 8"
And insert:
--claim 11-- between "The method of" and ",wherein the POI file includes"

Signed and Sealed this
Twelfth Day of May, 2020

Andrei Iancu
*Director of the United States Patent and Trademark Office*